United States Patent [19]
Akiyama

[11] 3,872,482
[45] Mar. 18, 1975

[54] MEASURING SYSTEM SWITCHING MEANS FOR SINGLE LENS REFLEX CAMERA

[75] Inventor: Kazuhiro Akiyama, Omiya, Japan

[73] Assignee: Fuji Photo Optical Co., Ltd., Omiya-shi, Japan

[22] Filed: Nov. 9, 1973

[21] Appl. No.: 414,445

[30] Foreign Application Priority Data
Dec. 4, 1972 Japan.............................. 47-121764

[52] U.S. Cl................................... 354/46, 354/152
[51] Int. Cl. ............................................. G03b 7/20
[58] Field of Search ............. 354/46, 26, 27, 28, 29, 354/30, 40, 43, 60, 152

[56] References Cited
UNITED STATES PATENTS
3,470,807  10/1969  Uno ................................. 354/40 X
3,699,868  10/1972  Shimomura........................... 354/46

Primary Examiner—Richard A. Wintercorn

[57] ABSTRACT

In a single lens reflex camera including an exposure meter provided with a full-aperture measuring system and a stopped-down measuring system, an automatic switching means is provided for selectively energizing one of the systems. A changeover switch comprising two stationary contacts and a movable contact selectively put into contact with one of the stationary contacts is employed to selectively energize one of the systems and is associated with a slide member and a stop-down button. The slide member is slid by a movable pin in the camera which is moved by the lens barrel of a stopped-down measuring type lens when the lens barrel is mounted to the camera. The slide member is not slid when the lens barrel of a full-aperture measuring type lens is mounted to the camera. The stop-down button is manually depressed when the illumination is measured through the stopped-down measuring type lens. No measuring is performed unless the stop-down button is depressed when the stopped-down measuring type lens is mounted to the camera. Further, in this case, the shutter is prevented from being released unless the stop-down button is depressed to measure the illumination.

In another embodiment of this invention, the changeover switch is comprised of a pair of switches connected in parallel with the power supply and a three-contact changeover switch which selectively closes one of the circuits. One pair is directly associated with a movable pin which is moved by the lens barrel of the stopped-down measuring type lens and opened when the movable pin is moved. The other pair is directly associated with a manually operable stop-down button so as to be closed when the button is depressed. The three-contact changeover switch is operated by the stop-down button and switched from the full-aperture measuring circuit side to the stopped-down measuring circuit side when the button is depressed.

23 Claims, 8 Drawing Figures

MEASURING SYSTEM SWITCHING MEANS FOR SINGLE LENS REFLEX CAMERA

BACKGROUND OF THE DISCLOSURE

1. Field of the Invention

This invention relates to a means for switching a measuring system in a single lens reflex camera, and more specifically to a means for carrying out a selective switching between a full aperture measuring system and a stopped-down measuring system provided in a single lens reflex camera which includes an exposure meter and is adapted to be used with interchangeable lenses of different measuring system.

2. Description of the Prior Art

It has been known in the art to provide different types of measuring systems in a single lens reflex camera with an exposure meter so that different types of interchangeable lenses may be mounted to the camera. In such a camera, it is necessary to switch the measuring circuit according to the type of the interchangeable lens mounted thereto in order to perform a correct measuring and obtain a correct exposure.

In the conventional camera of the above-described type which is capable of full aperture measuring, stopped-down measuring is performed by manually switching the circuit from the full aperture measuring circuit to the stopped-down measuring circuit. If the photographer forgets to operate the manual switch, the measuring system does not work normally.

SUMMARY OF THE INVENTION

In view of the above-mentioned defect inherent in the conventional camera, the primary object of the present invention is to provide an automatic changeover switching means for switching between the different types of the measuring systems in a single lens reflex camera according to the type of the interchangeable lens mounted to the camera.

Another object of the present invention is to provide an automatic changeover switching means for switching between different types of measuring systems in a single lens reflex camera in which the shutter is prevented from being released before measuring when a stopped-down measuring type lens is mounted to the camera.

Still another object of the present invention is to provide an automatic changeover switching means for switching between different types of the measuring systems in a single lens reflex camera in which the stopped-down measuring circuit is closed when a manual stop-down button used for performing the stop-down measuring is depressed.

A further object of the present invention is to provide an automatic changeover switching means for switching between different types of measuring systems in a single lens reflex camera in which the full-aperture measuring circuit is opened when a stopped-down measuring type of lens is mounted to the camera.

The above objects are accomplished by providing in a single lens reflex camera of TTL (through the taking lens measuring system) type a changeover switch which is operated to selectively energize a full-aperture measuring circuit or a stopped-down aperture measuring circuit by a movable pin and a stop-down button. The movable pin is moved by the lens barrel of an interchangeable lens of the stopped-down measuring type when the lens is mounted to the camera. Said stop-down button is manually depressed when the illumination is measured through the stopped-down measuring type lens. Further, when the stopped-down measuring type lens is mounted to the camera, the shutter release mechanism is locked so as not to release the shutter unless the stop-down button is depressed. Therefore, no measuring is performed unless the stop-down button is depressed when the stopped-down measuring type lens is mounted to the camera. Further, when the stopped-down measuring type lens is mounted to the camera, the shutter cannot be released unless the stop-down button is depressed to measure the illumination.

DESCRIPTION OF THE PREFERRED EMBODIMENTS

Figure 1:
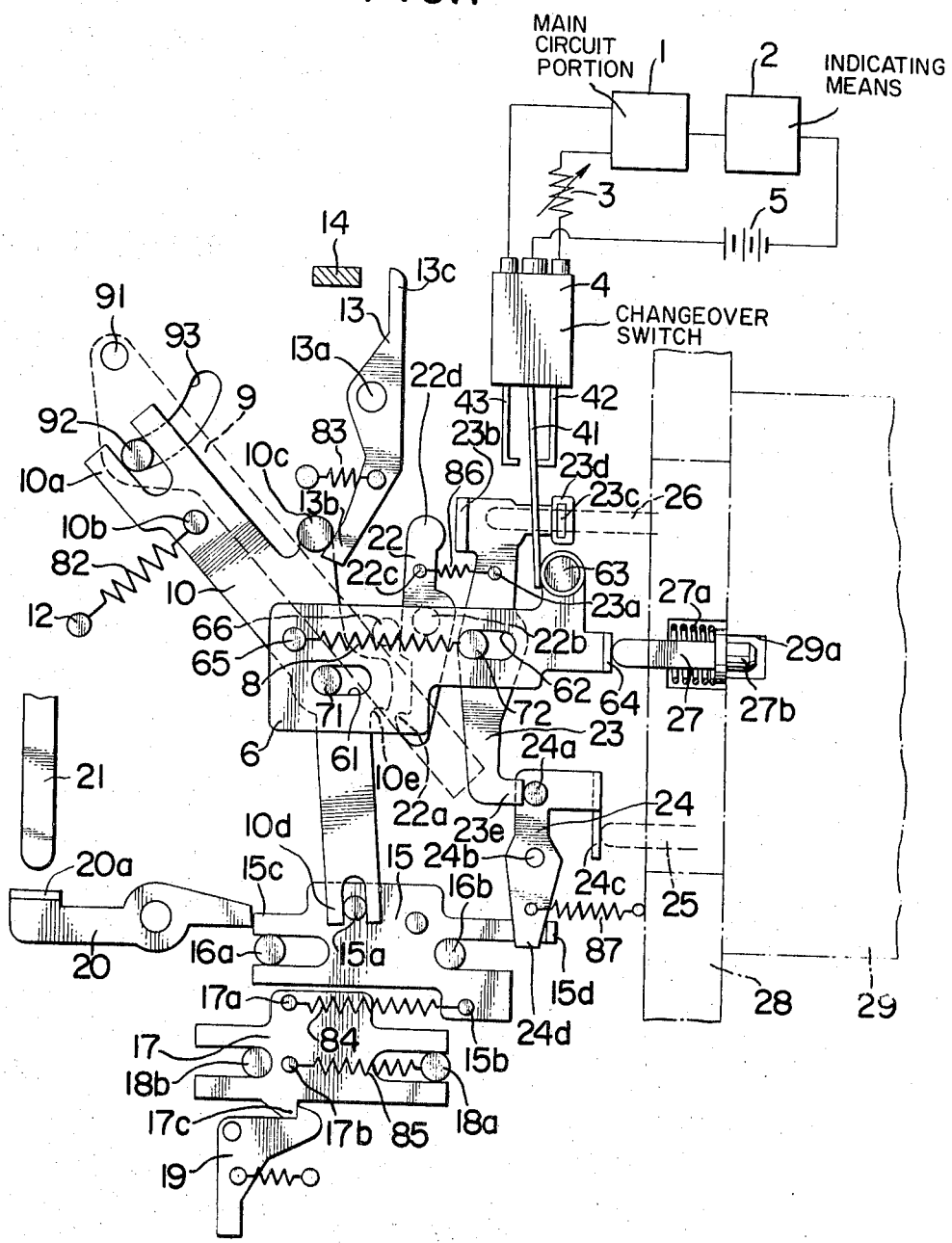
FIG. 1 is a vertical view of the mechanism constituting the switching means in accordance with the present invention in which a full-aperture measuring type lens is mounted to the camera and a changeover switch is in the position to close the full-aperture measuring circuit.

Referring to FIG. 1 the measuring circuit comprises a main circuit portion 1 including a photoelectric element and an amplifier, an indicating means 2 including an indicating circuit with an indicator, a stop value setting means 3 including a variable resistor and a sliding member which is to be associated with the aperture setting ring of a full-aperture measuring type lens, a changeover switch 4 including a movable contact 41 and two stationary contacts 42 and 43 with which said movable contact 41 is selectively put into contact, and a power supply 5.

The changeover switch 4 closes a full aperture measuring circuit when the movable contact 41 is put into contact with the stationary contact 42, and closes a stopped-down aperture measuring circuit when the movable contact 41 is put into contact with the other stationary contact 43.

The movable contact 41 is biased to be in contact with the stationary contact 42 by its elasticity and put into contact with the other stationary contact 43 when it is urged by a force overcoming the elasticity. The sliding member of said stop value setting means 3 is to be mechanically associated with the aperture setting ring of the lens barrel of an interchangeable lens provided with a full-aperture measuring means so that the quantity of light coming through the full aperture may be converted to an electric current proportional to the light coming through the aperture stopped down to a predetermined size.

A slide member 6 having guide slots 61 and 62 is slidably provided in the camera with the slots 61 and 62 loosely engaged with fixed guide pins 71 and 72. The slide member 6 is provided with a switch operating pin 63 which is brought into engagement with the movable contact 41 and moves the contact 41 into contact with said stationary contact 43. At one end of the slide member 6 is formed a bent portion 64 which is in abutting engagement with a push pin 27 which will be described in detail hereinafter. A tension spring 8 is tensioned between a pin 65 fixed to the slide member 6 and said guide pin 72 to urge the slide member rightward in FIG. 1. The slide member 6 is further provided with a pin 66 on the opposite side to be engaged with a release preventive lever 22 which will be described hereinafter. The reference numeral 9 indicates a swing mirror swingably mounted on a fixed pivot 91. The swing mirror 9 has a pin 92 on the side thereof which extends through an arcuate slot 93 provided in a wall of the camera. Said pins 71 and 72 and other fixed pins and pivots are fixed to said wall. A mirror actuating lever 10 is pivotally mounted on said pin 71 and one end thereof is formed to have a fork 10a engaged with said pin 92. The mirror actuating lever 10 is urged in the counterclockwise direction by means of a tension spring 82 tensioned between a fixed pin 12 and a pin 10b on the lever 10. The mirror actuating lever 10 is provided with a projection 10c to be engaged with a shutter release lever 13 pivotally mounted on a pivot 13a. The shutter release lever 13 is urged clockwise to be in contact with said projection 10c at one end 13b thereof by means of a tension spring 83 and the other end 13c thereof is formed to move a lock member 14 to a release position when the release lever 13 is rotated counterclockwise. The lock member 14 locks the leading shutter curtain of a focal plane shutter. When the lock member 14 is released, the leading shutter curtain starts to run and the exposure starts. The other end of the mirror actuating lever 10 is formed to have a fork 10d which is engaged with a pin 15a of a first driving plate 15. The first driving plate 15 is guided by a pair of pins 16a and 16b to slide back and forth. The first driving plate 15 has a pin 15b with which one end of a tension spring 84, the other end of which is connected with a pin 17a of a second driving plate 17, is connected. The second driving plate 17 is guided by a pair of fixed pins 18a and 18b to slide back and forth and is spring urged to the right by means of a tension spring 85 tensioned between a pin 17b on the plate 17 and the fixed pin 18a. The second driving plate 17 is provided with a projection 17c to be engaged with a hook lever 19 to hold the second driving plate 17 in the charged position as shown in FIG. 1. The left end 15c of said first driving plate 15 is engaged with one end of an engaging lever 20 so that the first driving plate 15 may be moved leftward when the engaging lever 20 is disengaged from the end 15c of the plate 15. The engaging lever 20 is provided with a bent portion 20a at an end thereof which is to be pushed down by a shutter release rod 21 which is in turn moved down upon depression of a shutter button (not shown). When the shutter release rod 21 is moved down to rotate the engaging lever 20 counterclockwise, the engaging lever 20 is disengaged from the first driving plate 15 and the plate 15 is moved leftward by the tension of the spring 84. Upon the leftward slide of the slide member 15, the mirror actuating lever 10 is rotated clockwise to swing up the mirror 9. After the shutter is released, the hook lever 19 is rotated clockwise by a member which is operated upon wind-up of the film and the lever 19 is disengaged from said projection 17c of the second driving plate 17. Then, the second driving plate 17 is moved to the right by the tension of the spring 85 and the shoulder thereof pushes the lower portion of the first driving plate 15 to move the same to the right up to the original position as shown in FIG. 1.

Said mirror actuating lever 10 is provided with a cutaway portion 10e in the vicinity of the pin 71 upon which it pivots. The cut-away portion 10e of the mirror actuating lever 10 engages a pawl 22a of a release preventive lever 22. The release preventive lever 22 is rotatably mounted to a fixed pin 22b and urged to rotate clockwise by means of a tension spring 86. The tension spring 86 is tensioned between a pin 22c on the release preventive lever 22 and a pin 23a on an interlocking lever 23. The interlocking lever 23 is rotatably mounted on said fixed pin 72 and urged to rotate counterclockwise by said tension spring 86. The interlocking lever 23 has at the top end thereof a bent portion 23b and a switch operating bent portion 23c wrapped with an insulating layer 23d. The bent portion 23b abuts on the upper end 22d of said release preventive lever 22. The other bent portion 23c with the insulating layer 23d is engaged with said movable contact 41 of said changeover switch 4. When the interlocking lever 23 is rotated counterclockwise the bent portion 23b pushes the upper end 22d of the release preventive lever 22 leftward to rotate the lever 22 counterclockwise and disengage said pawl 22a from the cut-away portion 10e of the mirror actuating lever 10 to allow the clockwise rotation thereof. The lower end 23e of the interlocking lever 23 abuts on a pin 24a of a stop operating lever 24. The stop operating lever 24 is pivotally mounted on a pivot 24b and urged to rotate counterclockwise by means of a tension spring 87. The upper end of the stop operating lever 24 is provided with a bent portion 24c which is to push a stop-down pin 25. The stop-down pin 25 stops down the aperture of the lens when pushed rightward by the bent portion 24c of the stop operating lever 24. The lower end 24d of the stop operating lever 24 is engaged with a bent portion 15d formed at the right end of the first driving plate 15 so that the lever 24 may be rotated clockwise when the first driving plate 15 moves leftward.

Said pin 66 of the slide member 6 is engaged with said release preventive lever 22 to limit the clockwise rotation of the lever 22. When the slide member 6 is moved leftward, the release preventive lever 22 is allowed to rotate clockwise to a greater degree and the pawl 22a of the lever 22 falls into engagement with the cut-away portion 10e of the mirror actuating lever 10.

A manual stop-down pin 26 of the camera is movable back and forth so that it may push said bent portion 23b of the interlocking lever 23 leftward. When the manual stop-down pin 26 is moved leftward in FIG. 1, the top end of the pin 26 pushes the bent portion 23b of the lever 23 leftward to rotate the interlocking lever 23 counterclockwise. As the interlocking lever 23 is rotated counterclockwise, the lower end 23e of the lever 23 pushes the pin 24a of the stop operating lever 24 and rotates the lever 24 to push said stop-down pin 25 rightward.

Said push pin 27 which abuts on the bent portion 64 of the slide member 6 is provided in the flange 28 of the camera and urged rightward by means of a compression spring 27a. The push pin 27 has a projected head portion 27b which is to be engaged with a recess 29a of a lens barrel 29 of the full-aperture measuring type. The push pin 27 may be an independent pin provided in the camera for the purpose of operating said slide member 6. Alternatively, a fixed position lock pin which is used to lock the lens barrel 29 at a predetermined fixed position in the camera may be used for this purpose. When a lens barrel 30 of the stopped-down measuring type is mounted to the camera as shown in FIG. 1, the push pin 27 is pushed in as shown in FIG. 2 by the surface 30a of the lens barrle 30.

Now the operation of the above described switch means will be described in detail with reference to FIGS. 1, 2 and 3.

When a lens barrel 29 of the full-aperture measuring type lens is mounted to the camera as shown in FIG. 1, the projected head portion 27b of the push pin 27 enters the recess 29a of the lens barrel 29 and accordingly the push pin 27 is in the retracted position as shown in FIG. 1. Therefore, the slide member 6 is in its extreme right position and the movable contact 41 is in contact with the stationary contact 42 to close the full-aperture measuring circuit including said stop value setting means 3. Since the slide member 6 is in the right position, the pin 66 prevents the pawl 22a of the release preventive lever 22 from being engaged with the cut-away portion 10e of the mirror actuating lever 10. Thus, full-aperture exposure can be performed and the shutter can be released at any time. When it is desired to stop down the aperture with the full-aperture measuring type lens, the manual stop-down pin 26 is pushed to rotate the interlocking lever 23 counterclockwise and rotate the stop operating lever 24 clockwise to push the stop-down pin 25 to the right and stop down the aperture. At the same time, the bent portion 23c covered with the insulating layer 23d pushes the movable contact 41 into contact with the stationary contact 43 to close and energize the stopped down measuring circuit. Thus, stopped-down measuring becomes possible.

Figure 2:
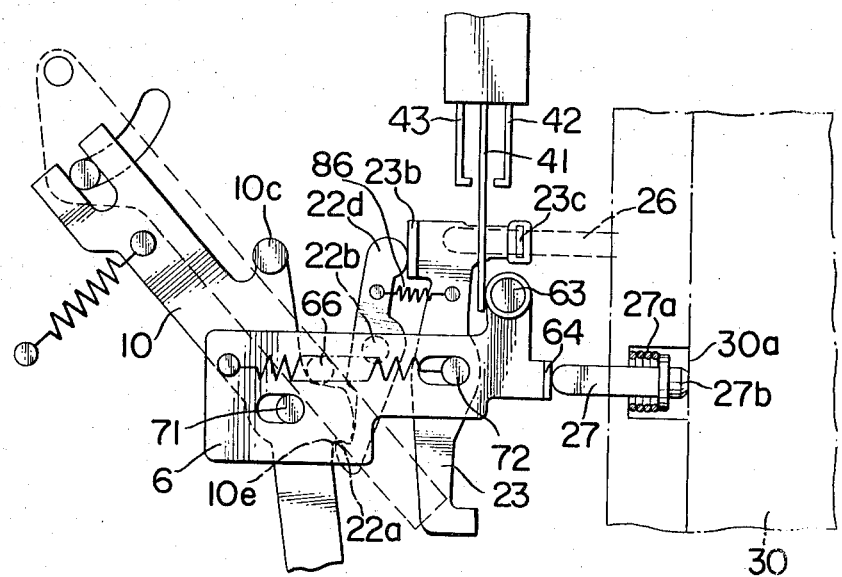
FIG. 2 is a fragmentary vertical view showing the main part of the mechanism in which a stopped-down measuring type lens is mounted to the camera and the changeover switch is in its neutral position.
Figure 3:
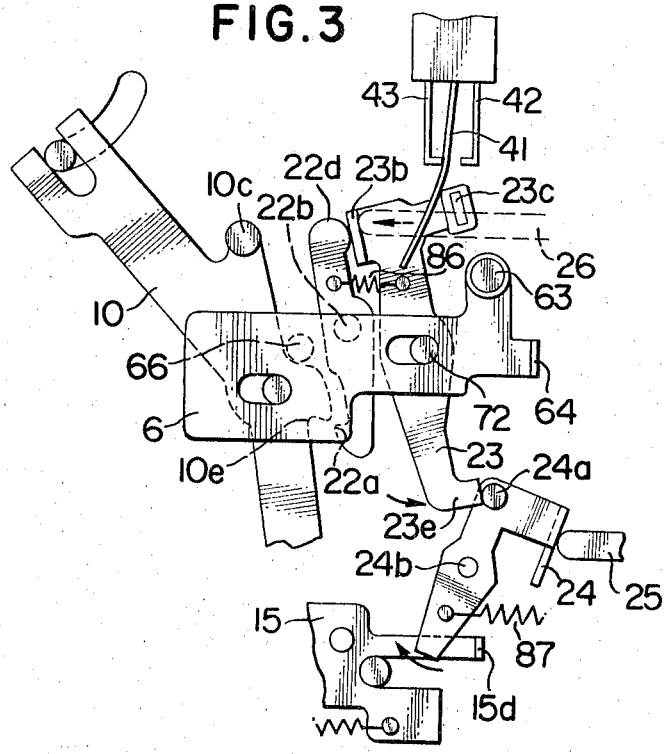
FIG. 3 is mechanism fragmentary vertical view showing the main part of the jechanism is shown in FIG. 2 in which a stopped-down measuring type lens is mounted to the camera and the changeover switch is in the position to close the stopped-down measuring circuit.

When a lens barrel 30 of the stopped-down measuring type lens is mounted to the camera as shown in FIG. 2, the push pin 27 is pushed in by the surface 30a of the lens barrel 30 overcoming the spring force of the compression spring 27a and accordingly the push pin 27 is moved to the leftmost projected position. By the leftward movement of the push pin 27, the slide member 6 is moved to the left up to the leftmost position as shown in FIG. 2 in which the switch operating pin 63 holds the movable contact 41 in the position separated from the stationary contact 42. The measuring circuit is opened, accordingly. Simultaneously with the leftward movement of the slide member 6, the pin 66 allows the release preventive lever 22 to rotate clockwise. By the clockwise rotation of the lever 22, the pawl 22a falls into engagement with the cut-away portion 10e of the mirror actuating lever 10 to prevent the mirror actuating lever 10 from swinging up and releasing the shutter. Therefore, when the lens barrel 30 of the stopped-down measuring type lens is mounted to the camera, the measuring circuit is opened and the shutter is prevented from being released. There is no fear of erroneously releasing the shutter without sufficient measurement of illumination. Further, since the indicating means 2 is not energized when the circuit is opened upon mounting of the lens barrel 30 of the stopped-down measuring type lens to the camera body, there is made no indication in the indicating means. Therefore, the photographer notices that the lens mounted to the camera is of a stopped-down measuring type and that the stop-down operation is necessary. Then, when the manual stop-down pin 26 is depressed, the top end of the pin 26 pushes the bent portion 23b of the interlocking lever 23 to rotate the same counterclockwise as shown in FIG. 3. When the interlocking lever 23 rotates counterclockwise, the bent portion 23b thereof pushes the upper end 22d of the release preventive lever 22 leftward to rotate the same counterclockwise. Accordingly, the pawl 22a of the release preventive lever 22 is disengaged from the cut-away portion 10e of the mirror actuating lever 10 as shown in FIG. 3. At the same time, said bent portion 23c of the interlocking lever 23 moves the movable contact 41 further to the left to put it into contact with the stationary contact 43 to close the stopped-down measuring circuit. Thus, when the manual stop-down pin 26 is depressed, stopped-down measuring becomes possible and the shutter can be released.

It will be understood that the purpose of retaining the mirror actuating lever 10 is to prevent the shutter from being released. Therefore, the retaining of the lever 10 may be conducted at any part of the lever 10. Further, the release preventive means need not be associated with the mirror actuating lever 10 but may be associated with any part of the shutter release mechanism including the shutter release rod 21, the engaging lever 20, the first driving plate 15, and the shutter release lever 13. The swing mirror itself may be locked to prevent the shutter release. The stop operating lever 24 can also be the member, if it is locked, to prevent the shutter release.

Now referring to FIGS. 4 to 6B, a second embodiment of the present invention will be described in detail. In the second embodiment, the changeover switch is comprised of a pair of ON-OFF switches 102 and 103 connected in parallel with the power supply and a three-contact changeover switch 104 which selectively closes one of the circuits. One of the pair of switches 102 is directly associated with a movable pin 127 which is moved by the lens barrel 130 of the stopped down measuring type lens and opened when the movable pin 127 is moved. The other of the pair of switches 103 is directly associated with a manually operable stop-down pin 126 so as to be closed thereby when the pin is depressed. The three-contact changeover switch 104 is operated by the stop-down pin 126 and switched from the full-aperture measuring circuit to the stopped-down measuring circuit when the stop-down pin 126 is depressed.

Figure 4:
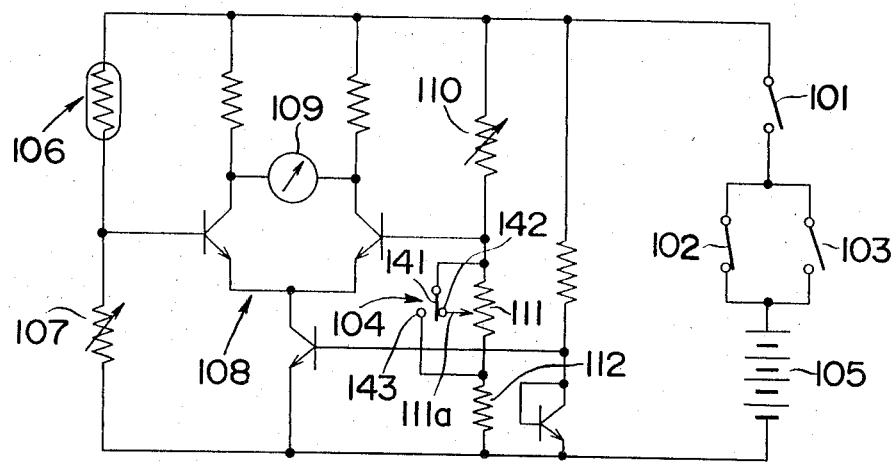
FIG. 4 is a circuit view showing a second embodiment of the present invention.

FIG. 4 shows an electric circuit which employs the switch means in accordance with the present invention, in which a main power supply switch 101 and a parallel pair of power supply ON-OFF switches 102 and 103 are connected in series with a power supply 105. The main power switch 101 is normally open, and is closed in response to the first stage of depression of the shutter release button. A photoelectric element 106 such as a cadmium sulfide element is connected in series with a variable resistor 107 and connected across the power supply 105. The variable resistor 107 is controlled in accordance with the sensitivity of the film loaded in the camera so that the exposure control or measurement may be made with regard for the film speed. The connecting point between the photoelectric element 106 and the variable resistor 107 is connected with an input of an operating amplifier 108, which includes an exposure meter 109. A second variable resistor 110 which is controlled in accordance with the shutter speed and a third variable resistor 111 which is controlled in accordance with the size of the diaphragm are connected in series with a resistor 112 and connected across the power supply 105. A slide contact 111a to control the third variable resistor 111 is connected with a stationary contact 142 of the changeover switch 104. The power supply side end of the third variable resistor 111 is connected with a second stationary contact 143 of the changeover switch 104. A movable contact 141 which is selectively put into contact with one of the stationary contacts 142 and 143 is connected with the other end of the third variable resistor 111. Therefore, when the movable contact 141 is in contact with the stationary contact 142 which is connected with said slide contact 111a of the third variable resistor 111, the resistance set by the variable resistor in accordance with the size of the diaphragm is put into the circuit so as to form a full-aperture measuring circuit. When the movable contact 141 is in contact with the other stationary contact 143, the third variable resistor 111 is eliminated from the circuit to form a stopped-down measuring circuit. The movable contact 141 is urged into contact with the contact 142 to form the full-aperture measuring circuit.

One of said pair of power supply ON-OFF switches 102 is normally closed and the other power supply ON-OFF switch 103 is normally open. The former power supply ON-OFF switch 102 is opened when the lens barrel of a stopped-down measuring type lens is mounted to the camera and the latter power supply switch 103 is closed when a manually operable stop-down pin 126 is depressed.

Figure 5A:
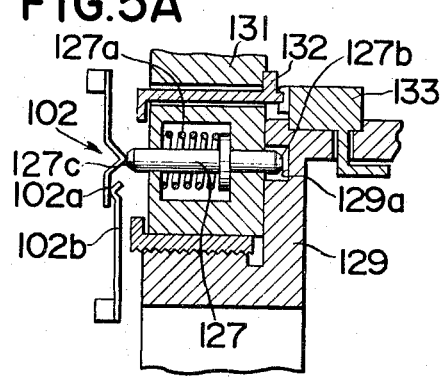
FIG. 5A is a fragmentary side sectional view showing a movable pin associated with a switch in the camera in accordance with the second embodiment of the invention in which the pin is in the projected position.
Figure 5B:
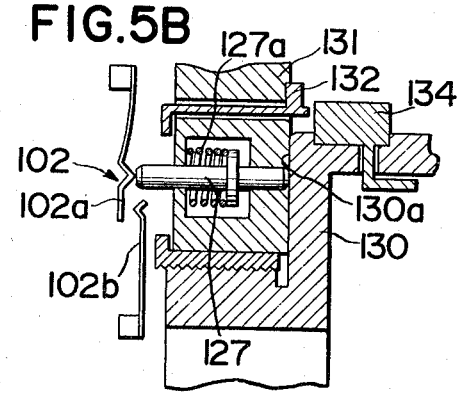
FIG. 5B is a fragmentary side sectional view similar to FIG. 5A in which the movable pin is in the depressed position.

Now referring to FIGS. 5A to 6B, the mechanical construction of the switch means in accordance with the second embodiment of the present invention will be described in detail. A movable pin 127 is provided in a flange 131 of the camera so as to be moved in a direction parallel to the optical axis of the taking lens. Normally, the movable pin 127 is spring biased to the right in FIG. 5A by means of a compression spring 127a to project the head 127b thereof beyond the surface of the flange 131. A first normally closed ON-OFF switch 102 comprising a stationary contact 102b and a movable spring contact 102a is provided in the camera just behind the movable pin 127 so that the movable contact 102a which is normally in contact with the stationary contact 102b may be separated from the stationary contact 102b when the movable pin 127 is depressed as shown in FIG. 5B. When the lens barrel 129 of a full-aperture measuring type lens is mounted to the camera at the flange 131 thereof, the head 127b of the movable pin 127 enters the recess 129a of the lens barrel 129. On the other hand, when the lens barrel 130 of a stopped-down measuring type lens is mounted to the camera, the head 127b of the movable pin 127 is pushed into the flange 131 by the flat surface 130a of the lens barrel 130.

Figure 6A:
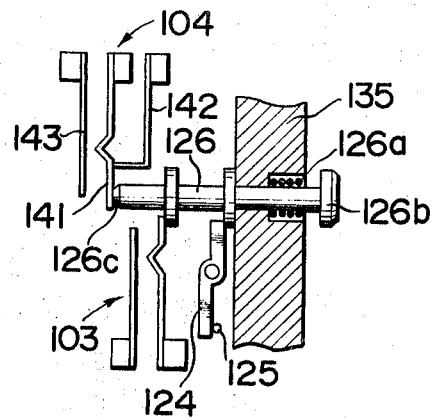
FIG. 6A is a fragmentary side sectional view showing a stop-down pin employed in the second embodiment of the invention in which the stop-down pin is in the projected position.
Figure 6B:
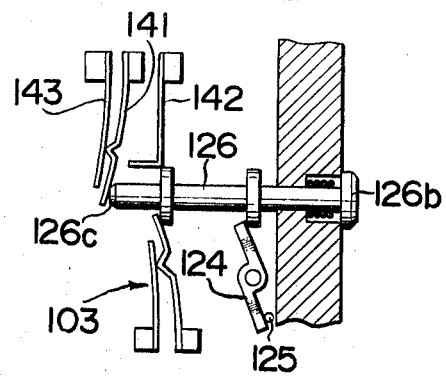
FIG. 6B is a fragmentary side sectional view similar to FIG. 6A in which the stop-down pin is in the depressed position.

The reference numeral 132 indicates an interlocking member which is associated with a stop setting ring 133 of the full-aperture measuring type lens so that the set stop value of the lens may be transmitted to the full-aperture measuring circuit in the camera when the stop setting 133 is rotated. When the lens barrel of the stopped-down measuring type lens is mounted to the camera, the interlocking member 132 is not engaged with the stop setting ring 134 of the stopped-down measuring type lens barrel 130 as shown in FIG. 5B. Said changeover switch 104 is associated with a manually operable stop-down pin 126 as shown in FIGS. 6A and 6B. The stop-down pin 126 is provided in the camera with the head 126b thereof exposed out of a wall 135 of the camera and spring biased by means of a compression spring 126a to the right in FIG. 5A. Said movable contact 141 of the changeover switch 104 is in contact with the stationary contact 142 to form a second normally closed switch and close the full-aperture measuring circuit, when the stop-down pin 126 is in the projected position as shown in FIG. 6A. When the stop-down pin 126 is depressed, the movable contact 141 is pushed by the end 126c of the pin 126 and separated from the contact 142 and put into contact with the other stationary contact 143 to close the stopped-down measuring circuit. The manually operable stop-down pin 126 is further associated with a first normally open ON-OFF switch 103, which corresponds to the other of said pair of power supply ON-OFF switches, so that the ON-OFF switch 103 may be opened when the pin 126 is in the projected position as shown in FIG. 6A and closed when the pin 126 is depressed as shown in FIG. 6B. The stop-down pin 126 is further associated with a stop operating lever 124 which is in turn engaged with a pin 125 to stop down the aperture. When the stop-down pin 126 is manually depressed, the stop operating lever 124 is rotated as shown in FIG. 6B to actuate the pin 125 to stop down the aperture.

In the second embodiment constructed as described above with reference to FIGS. 4 to 6B, the first normally closed power supply ON-OFF switch 102 is closed and the second normally closed switch contacts 141, 142 are closed to energize the full-aperture measuring circuit when the lens barrel 129 of a full-aperture measuring type lens is mounted to the camera and the stop-down pin 126 is not depressed. On the other hand, when the lens barrel 130 of a stopped-down measuring type lens is mounted to the camera, the first normally closed power ON-OFF switch 102 is opened to de-energize the circuit. Further, by depressing the manually operable stop-down pin 126, the second normally open power supply ON-OFF switch 103 is closed and the second normally open switch 141, 143 contacts are closed to energize the stopped-down measuring circuit. At the same time, the aperture is stopped down. When the stopped-down measuring type lens is mounted to the camera and the stop-down pin 126 is not depressed, the circuit is not energized as mentioned hereinabove. Therefore, the photographer will easily notice that the camera is not mounted with a full-aperture measuring type lens if an exposure value indicating means is inserted in the circuit.

What is claimed is:

1. In a single lens reflex camera including a full-aperture measuring circuit and a stopped-down measuring circuit, a switch means for selectively energizing one of said circuits comprising:

a changeover switch means selectively closing one of said circuits, a movable pin provided on the lens mount of the camera so as to be moved by the lens barrel of a stopped-down measuring type lens from a first position to a second position, said movable pin being associated with said changeover switching means so as to close said full-aperture measuring circuit and open said stopped-down measuring circuit when the movable pin is in said first position and open both said full-aperture measuring circuit and said stopped-down measuring circuit when the movable pin is in said second position, and a manually operable stop-down pin provided in the camera so as to be manually moved from a first position in which the aperture of the lens is fully open to a second position in which the aperture of the lens is stopped down, said stop-down pin being associated with said changeover switching means so as to close said full-aperture measuring circuit when the stop-down pin is in the first position and open said full-aperture measuring circuit and close said stopped-down measuring circuit when the stop-down pin is in said second position.

2. In a single lens reflex camera including a full-aperture measuring circuit and a stopped-down measuring circuit, a switch means for selectively energizing one of said circuits comprising:

a changeover switching means including a first switch means which closes said full-aperture measuring circuit and a second switch means which closes said stopped-down measuring circuit.

a movable pin provided on the lens mount of the camera so as to be moved by the lens barrel of a stopped-down measuring type lens from a first position to a second position, said movable pin being associated with said changeover switching means and closing said first switch means when the pin is in said first position and opening both said first and second switch means when the pin is in said second position, and a manually operable stop-down pin provided in the camera so as to be manually moved from a first position to a second position, said manually operable stop-down pin being associated with said changeover switching means and closing said first switch means when the stop-down pin is in said first position and opening said first switch means and closing said second switch means when the stop-down pin is in said second position.

3. A switch means in a single lens reflex camera as defined in claim 2 wherein said movable pin is urged by means of a spring to project the head thereof beyond the surface of a lens mount of the camera so that the head may be depressed by the surface of the lens barrel of a stopped-down measuring type.

4. A switch means as defined in claim 2 wherein said manually operable stop-down pin is spring urged into said first position with the head thereof exposed on the front surface of the camera and moved to said second position when the head thereof is depressed.

5. In a single lens reflex camera including a full-aperture measuring circuit and a stopped-down measuring circuit, a switch means for selectively energizing one of said circuits comprising:

a changeover switching means including a first switch means which closes said full-aperture measuring circuit and a second switch means which closes said stopped-down measuring circuit, a movable pin provided on the lens mount of the camera so as to be moved by the lens barrel of a stopped-down measuring type lens from a first position to a second position, said movable pin being associated with said changeover switching means and closing said first switch means when the pin is in said first position and opening said first switch means when the pin is in said second position, and a manually operable stop-down pin provided in the camera so as to be manually moved from a first position to a second position, said manually operable stop-down pin being associated with said changeover switching means and closing said first switch means when the stop-down pin is in said first position and opening said first switch means and closing said second switch means when the stop-down pin is in said second position, and said first switch means comprising a first normally closed switch associated with said movable pin so as to be opened when the movable pin is depressed, and a second normally closed switch associated with said manually operable stop-down pin so as to be opened when the stop-down pin is depressed.

6. A switch means as defined in claim 5 wherein said second switch means comprises a first normally open switch and a second normally open switch, said first and second normally open switches being associated with said manually operable stop-down pin so as to be closed when the stop-down pin is depressed.

7. A switch means as defined in claim 6 wherein said first normally closed switch and said first normally open switch are connected in parallel with the power supply of the circuits.

8. A switch means as defined in claim 6 wherein said second normally closed switch and said second normally open switch are comprised of a pair of stationary contacts and a movable contact selectively put into contact with one of the contacts, said movable contact being associated with said stop-down pin so that the movable contact may be separated from one contact for the full-aperture measuring circuit and put into contact with the other contact for the stopped-down measuring circuit when the stop-down pin is depressed.

9. In a single lens reflex camera including a full-aperture measuring circuit and a stopped-down measuring circuit, a switch means for selectively energizing one of said circuits comprising;

a changeover switch means selectively closing one of said circuits, a first movable member provided in the camera a part of which is associated with said changeover switch, said first movable member being movable between a first position in which said changeover switch closes said full-aperture measuring circuit and a second position in which said part of the member operates the switch to open both the full-aperture measuring circuit and the stopped-down measuring circuit, a second movable member provided in the camera a part of which is associated with said changeover switch, said second movable member being movable between a first position in which said part thereof is not engaged with the changeover switch and a second position in which said part thereof operates the switch to close said stopped-down measuring circuit, a movable pin provided on the lens mount of the camera so as to be moved by the lens barrel of a stopped-down measuring type lens when the lens barrel is mounted to the camera, said movable pin being associated with said first movable member to move the first movable member from said first position to said second position when said pin is moved by the lens barrel of the stopped-down measuring type lens, and a manually operable stop-down pin provided in the camera to move said second movable member from said first position to said second position when depressed.

10. A measuring system switching means as defined in claim 9 wherein a shutter release preventing means is associated with said first movable member so that the shutter release preventing means may be operated to prevent the release of the shutter in response to the movement of said first movable member from the first position to the second position.

11. A switching means as defined in claim 10 wherein said first movable member is a slide member provided with a pin fixed thereto and said shutter release preventing means is a lever engaged with said pin on the slide member, and said lever is put into the shutter release preventing position when said slide member is moved from said first position to said second position.

12. A switching means as defined in claim 11 wherein said lever for preventing the release of the shutter is engaged with a part of the shutter release mechanism to hold a part of the release mechanism to prevent the release of the shutter.

13. A switching means as defined in claim 12 wherein said lever for preventing the release of the shutter is put into engagement with a swing mirror actuating lever in the camera to hold the actuating lever when said slide member is moved from the first position to the second position.

14. A switching means as defined in claim 12 wherein said lever for preventing the release of the shutter is put into engagement with a swing mirror in the camera which is associated with a shutter release lever.

15. A switching means as defined in claim 10 wherein said shutter release preventing means is associated with said manually operable stop-down pin so that the shutter release preventing means may be retracted from the operating position in response to the depression of the manually operable stop-down pin, whereby the shutter is made releasable when the manually operable stop-down pin is depressed.

16. A switching means as defined in claim 9 wherein an indicating means which indicates exposure information is connected in series with said measuring circuits, whereby no indication is made when said first movable member is in said second position.

17. A switching means as defined in claim 9 wherein said changeover switch comprises two stationary contacts and a movable contact selectively put into contact with one of said contacts, and said first movable member is a slide member which has a pin engaged with said movable contact, said movable contact being urged into contact with one of the stationary contacts to close said full aperture measuring circuit and separated from said contact by said pin when said slide member is moved from said first position to said second position.

18. A switching means as defined in claim 17 wherein said second movable member is a rotatable lever which has a portion to be engaged with said movable contact, and said portion moves said movable contact into contact with the other of said stationary contacts to close said stopped-down measuring circuit when the rotatable lever is rotated by said manually operable stop-down pin.

19. A switching means as defined in claim 18 wherein said rotatable lever is engaged with a stop operating lever which is in turn engaged with a stop-down pin to stop down the aperture of the lens mounted to the camera, whereby the aperture is stopped down when the rotatable lever is rotated by depression of said manually operable stop-down pin.

20. A switching means as defined in claim 9 wherein said movable pin is a pin to lock an interchangeable lens in a predetermined position.

21. A switch means in a single lens reflex camera as defined in claim 1 further comprising a shutter release preventing means provided in the camera so as to be moved by the lens barrel of a stopped-down measuring type lens from a first position in which the shutter release preventing means is not engaged with the shutter release means in the camera to a second position in which the shutter release preventing means is engaged with the shutter release means to prevent the release of the shutter and moved from the second position to the first position by said manually operable stop-down pin when said stop-down pin is moved from said first to the said second position thereof.

22. A switch means as defined in claim 21 wherein said shutter release preventing means is a lever having a pawl which is brought into engagement with a part of the shutter release means to hold the same by said movable pin on the lens mount when a lens barrel of a stopped-down measuring type lens is mounted to the camera.

23. A switch means as defined in claim 22 wherein said lever for preventing the shutter release is brought into engagement with a part of a mirror actuating lever associated with a shutter release lever to unlock a leading shutter curtain locking lever.

* * * * *